United States Patent
Hui et al.

(10) Patent No.: US 10,097,395 B2
(45) Date of Patent: Oct. 9, 2018

(54) APPARATUS AND METHOD FOR TRANSMITTING AND RECEIVING SIGNAL BASED ON QAM CONSTELLATION

(71) Applicant: ELECTRONICS AND TELECOMMUNICATIONS RESEARCH INSTITUTE, Daejeon (KR)

(72) Inventors: Bing Hui, Daejeon (KR); Junhyeong Kim, Daejeon (KR); Il Gyu Kim, Chungcheongbuk-do (KR); Hoon Lee, Daejeon (KR); Hee Sang Chung, Daejeon (KR); Sung woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/493,870

(22) Filed: Apr. 21, 2017

(65) Prior Publication Data

US 2017/0310528 A1    Oct. 26, 2017

(30) Foreign Application Priority Data

Apr. 21, 2016  (KR) .................. 10-2016-0048990
Apr. 21, 2017  (KR) .................. 10-2017-0051478

(51) Int. Cl.
    *H04L 27/34*    (2006.01)

(52) U.S. Cl.
    CPC ................... *H04L 27/3488* (2013.01)

(58) Field of Classification Search
    CPC .................. H04L 27/3488; H04L 27/02–27/08
    See application file for complete search history.

(56) References Cited

U.S. PATENT DOCUMENTS 5,966,412 A * 10/1999 Ramaswamy ........ H04L 1/0054
                                                             375/261
7,274,653 B1 * 9/2007 Settle .................... H04L 25/062
                                                             370/206

(Continued)

FOREIGN PATENT DOCUMENTS

KR    2014-0123764 A    10/2014

OTHER PUBLICATIONS

R1-154056, "Symbol superposition based Gray Mapping Scheme for MUST to be Captured in TR", 3GPP TSG RAN WG1 Meeting #82, Beijing, China, Aug. 24-28, 2015.

*Primary Examiner* — Dac Ha
(74) *Attorney, Agent, or Firm* — Rabin & Berdo, P.C.

(57) ABSTRACT

A transmitting apparatus for modulating data based on a predetermined $2^q$-QAM constellation and a receiving apparatus and method for demodulating a signal based on the predetermined $2^q$-QAM constellation, wherein the last q-2 bits corresponding to a quadrant of the predetermined $2^q$-QAM constellation are same with a gray code of a $2^{q-2}$-QAM constellation, the last q-2 bits corresponding to the remaining quadrants of the predetermined $2^q$-QAM constellation are determined by performing symmetric transformation for the last q-2 bits of the quadrant of the predetermined $2^q$-QAM around the x-axis or the y-axis.

19 Claims, 8 Drawing Sheets

(56) References Cited

U.S. PATENT DOCUMENTS

| | | | |
|---|---|---|---|
| 7,315,578 B2 | 1/2008 | Cheng | |
| 7,826,340 B2 * | 11/2010 | Kalhan | H04L 27/3488 370/204 |
| 8,503,558 B2 | 8/2013 | Kwak et al. | |
| 8,559,566 B2 | 10/2013 | Yu et al. | |
| 9,401,833 B2 | 7/2016 | Sagong et al. | |
| 2004/0066844 A1 * | 4/2004 | Moon | H04L 27/0008 375/222 |
| 2015/0125161 A1 * | 5/2015 | Secondini | H04B 10/5161 398/186 |

* cited by examiner

| | | | | y | | | | |
|---|---|---|---|---|---|---|---|---|
| $A_{1,1}$:00 00 00 ○ | $A_{1,2}$:00 00 01 ○ | $A_{1,3}$:00 00 11 ○ | $A_{1,4}$:00 00 10 ○ | $A_{1,5}$:00 01 10 ○ | $A_{1,6}$:00 01 11 ○ | $A_{1,7}$:00 01 01 ○ | $A_{1,8}$:00 01 00 ○ |
| | | | | 3b | | | | |
| $A_{2,1}$:00 10 00 ○ | $A_{2,2}$:00 10 01 ○ | $A_{2,3}$:00 10 11 ○ | $A_{2,4}$:00 10 10 ○ | $A_{2,5}$:00 11 10 ○ | $A_{2,6}$:00 11 11 ○ | $A_{2,7}$:00 11 01 ○ | $A_{2,8}$:00 11 00 ○ |
| | | | | 2b | | | | |
| $A_{3,1}$:01 10 00 ○ | $A_{3,2}$:01 10 01 ○ | $A_{3,3}$:01 10 11 ○ | $A_{3,4}$:01 10 10 ○ | $A_{3,5}$:01 11 10 ○ | $A_{3,6}$:01 11 11 ○ | $A_{3,7}$:01 11 01 ○ | $A_{3,8}$:01 11 00 ○ |
| | | | | b | | | | |
| $A_{4,1}$:01 00 00 ○ | $A_{4,2}$:01 00 01 ○ | $A_{4,3}$:01 00 11 ○ | $A_{4,4}$:01 00 10 ○ | $A_{4,5}$:01 01 10 ○ | $A_{4,6}$:01 01 11 ○ | $A_{4,7}$:01 01 01 ○ | $A_{4,8}$:01 01 00 ○ |
| -3b | -2b | -b | 0 | b | 2b | 3b | x |
| $A_{5,1}$:11 00 00 ○ | $A_{5,2}$:11 00 01 ○ | $A_{5,3}$:11 00 11 ○ | $A_{5,4}$:11 00 10 ○ | $A_{5,5}$:11 01 10 ○ | $A_{5,6}$:11 01 11 ○ | $A_{5,7}$:11 01 01 ○ | $A_{5,8}$:11 01 00 ○ |
| | | | | -b | | | | |
| $A_{6,1}$:11 10 00 ○ | $A_{6,2}$:11 10 01 ○ | $A_{6,3}$:11 10 11 ○ | $A_{6,4}$:11 10 10 ○ | $A_{6,5}$:11 11 10 ○ | $A_{6,6}$:11 11 11 ○ | $A_{6,7}$:11 11 01 ○ | $A_{6,8}$:11 11 00 ○ |
| | | | | -2b | | | | |
| $A_{7,1}$:10 10 00 ○ | $A_{7,2}$:10 10 01 ○ | $A_{7,3}$:10 10 11 ○ | $A_{7,4}$:10 10 10 ○ | $A_{7,5}$:10 11 10 ○ | $A_{7,6}$:10 11 11 ○ | $A_{7,7}$:10 11 01 ○ | $A_{7,8}$:10 11 00 ○ |
| | | | | -3b | | | | |
| $A_{8,1}$:10 00 00 ○ | $A_{8,2}$:10 00 01 ○ | $A_{8,3}$:10 00 11 ○ | $A_{8,4}$:10 00 10 ○ | $A_{8,5}$:10 01 10 ○ | $A_{8,6}$:10 01 11 ○ | $A_{8,7}$:10 01 01 ○ | $A_{8,8}$:10 01 00 ○ |

APPARATUS AND METHOD FOR TRANSMITTING AND RECEIVING SIGNAL BASED ON QAM CONSTELLATION

CROSS-REFERENCE TO RELATED APPLICATION

This application claims priority to and the benefit of Korean Patent Application No. 10-2016-0048990 and 10-2017-0051478 filed in the Korean Intellectual Property Office on Apr. 21, 2016 and Apr. 21, 2017, the entire contents of which are incorporated herein by reference.

BACKGROUND OF THE INVENTION

(a) Field of the Invention

The present description relates to an apparatus and a method for transmitting and receiving a signal based on $2^q$-QAM constellation.

(b) Description of the Related Art

Recently, Quadrature Amplitude Modulation (QAM) has been widely used as a modulation scheme (i.e., symbol mapping) of a communication system. By using the QAM modulation scheme, any high spectral efficiency can be achieved by setting a suitable constellation size. The only limitations on the performance of the QAM modulation scheme are the noise level and the linearity of the communication channel.

Over time, mobile phone subscribers require quality of service and higher data rates, such as better error rate performance, faster processing speed, and lower battery consumption. A common solution for a modulation scheme perspective is to use a higher order modulation scheme to meet the increasing demands of users. However, the performance of higher order modulation schemes is limited by the noise level and environment of the communication channel. Therefore, it is an alternative to improve the performance of the currently used relatively low order QAM modulation schemes and to use them better.

SUMMARY OF THE INVENTION

An exemplary embodiment provides a transmitting apparatus for transmitting data based on a predetermined $2^q$-QAM constellation, the apparatus comprising: a processor, a memory, and a radio frequency unit, wherein the processor executes a program stored in the memory to perform: modulating data into a physical signal based on a predetermined $2^q$-quadrature amplitude modulation (QAM) constellation; and transmitting the physical signal to a receiving apparatus, wherein q is a multiple of 2 greater than 2, the data is q bits, a quadrant of the predetermined $2^q$-QAM constellation is determined based on a predetermined $2^{q-2}$-QAM constellation and a basic 4-QAM constellation, and remaining quadrants of the predetermined $2^q$-QAM constellation are determined based on the quadrant of the predetermined $2^q$-QAM constellation and the basic 4-QAM constellation.

Last q-2 bits of the q bits corresponding to the quadrant of the predetermined $2^q$-QAM constellation may be same with a gray code of the predetermined $2^{q-2}$-QAM constellation, last q-2 bits of the q bits corresponding to the remaining quadrants of the predetermined $2^q$-QAM constellation may be determined by performing symmetric transformation for the last q-2 bits of the quadrant of the predetermined $2^q$-QAM around the x-axis or the y-axis, and first 2 bits of the q bits corresponding to each quadrant of the predetermined $2^q$-QAM constellation may be determined by a basic 4-QAM constellation.

The predetermined $2^q$-QAM constellation is a predetermined 16-QAM constellation, the data is 4 bits, the last 2 bits of a 4 bits corresponding to a quadrant of the predetermined 16-QAM constellation are same with a gray code of the basic 4-QAM constellation, the last 2 bits of the 4 bits corresponding to the remaining quadrants of the predetermined 16-QAM constellation are determined by performing symmetric transformation for the last 2 bits of the quadrant of the predetermined 16-QAM around the x-axis or the y-axis, and the first 2 bits of the 4 bits corresponding to each quadrant of the predetermined 16-QAM constellation are determined by the basic 4-QAM constellation.

The predetermined $2^q$-QAM constellation is a predetermined 64-QAM constellation, the data is 6 bits, the last 4 bits of a 6 bits corresponding to a quadrant of the predetermined 64-QAM constellation are same with a gray code of the predetermined 16-QAM constellation, the last 4 bits of the 6 bits corresponding to the remaining quadrants of the predetermined 64-QAM constellation are determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation are determined by the basic 4-QAM constellation.

Another exemplary embodiment provides a receiving apparatus for receiving a signal based on a predetermined $2^q$-QAM constellation, the apparatus comprising: a processor, a memory, and a radio frequency unit, wherein the processor executes a program stored in the memory to perform: receiving a signal from a transmitting apparatus; and demodulating the signal into a symbol based on a predetermined $2^q$-quadrature amplitude modulation (QAM) constellation including $2^q$ symbol decision regions corresponding to a q-bit symbol, respectively, wherein when the processor performs the demodulating the signal into a symbol based on a predetermined $2^q$-QAM constellation, the processor performs: determining a first combined decision region including a symbol decision region in which the signal is located among four first combined decision regions to determine a first two bits of the symbol; determining a nth combined decision region including a symbol decision region in which the signal is located among four nth combined decision regions to determine a nth two bits of the symbol; and determining a final symbol decision region which is commonly included in the determined first combined decision region and the determined nth combined decision region.

The symbol may be a symbol allocated to the final symbol decision region.

The first combined decision region and the $n^{th}$ combined decision region may include four different symbol decision regions, respectively.

The predetermined $2^q$-QAM constellation may be a predetermined 16-QAM constellation and the symbol may be 4 bits, and when the processor performs the demodulating the signal into a symbol based on a predetermined $2^q$-QAM constellation, the processor may perform: determining a first combined decision region including a symbol decision region in which the signal is located among four first combined decision regions to determine a first two bits of the symbol; determining a second combined decision region including a symbol decision region in which the signal is located among four second combined decision regions to determine a last two bits of the symbol; and determining a final symbol decision region which is commonly included in the determined first combined decision region and the determined second combined decision region.

The last 2 bits of a 4 bits corresponding to a quadrant of the predetermined 16-QAM constellation may be same with a gray code of the basic 4-QAM constellation, the last 2 bits of the 4 bits corresponding to the remaining quadrants of the predetermined 16-QAM constellation may be determined by performing symmetric transformation for the last 2 bits of the quadrant of the predetermined 16-QAM around the x-axis or the y-axis, and the first 2 bits of the 4 bits corresponding to each quadrant of the predetermined 16-QAM constellation may be determined by the basic 4-QAM constellation.

The quadrant may be a second quadrant of the 16-QAM constellation, the last 2 bits of the 4 bits corresponding to a first quadrant of the remaining quadrant may be determined by performing symmetric transformation for the last 2 bits of the second quadrant of the predetermined 16-QAM around the y-axis, the last 2 bits of the 4 bits corresponding to a third quadrant of the remaining quadrant may be determined by performing symmetric transformation for the last 2 bits of the second quadrant of the predetermined 16-QAM around the x-axis, and the last 2 bits of the 6 bits corresponding to a fourth quadrant of the remaining quadrant may be determined by performing symmetric transformation for the last 2 bits of the first quadrant of the predetermined 16-QAM around the x-axis or by performing symmetric transformation for the last 2 bits of the third quadrant of the predetermined 16-QAM around the y-axis.

The predetermined $2^q$-QAM constellation may be a predetermined 64-QAM constellation and the symbol may be 6 bits, and when the processor performs the demodulating the signal into a symbol based on a predetermined $2^q$-QAM constellation, the processor may perform: determining a first combined decision region including a symbol decision region in which the signal is located among four first combined decision regions to determine a first two bits of the symbol; determining a second combined decision region including a symbol decision region in which the signal is located among four second combined decision regions to determine a second two bits of the symbol; determining a third combined decision region including a symbol decision region in which the signal is located among four third combined decision regions to determine a last two bits of the symbol; and determining a final symbol decision region which is commonly included in the determined first combined decision region, the determined second combined decision region, and the determined third combined decision region.

The last 4 bits of a 6 bits corresponding to a quadrant of the predetermined 64-QAM constellation may be same with a gray code of the predetermined 16-QAM constellation, the last 4 bits of the 6 bits corresponding to the remaining quadrants of the predetermined 64-QAM constellation may be determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation may be determined by the basic 4-QAM constellation.

The quadrant may be a second quadrant of the 64-QAM constellation, the last 4 bits of the 6 bits corresponding to a first quadrant of the remaining quadrant may be determined by performing symmetric transformation for the last 4 bits of the second quadrant of the predetermined 64-QAM around the y-axis, the last 4 bits of the 6 bits corresponding to a third quadrant of the remaining quadrant may be determined by performing symmetric transformation for the last 4 bits of the second quadrant of the predetermined 64-QAM around the x-axis, and the last 4 bits of the 6 bits corresponding to a fourth quadrant of the remaining quadrant may be determined by performing symmetric transformation for the last 4 bits of the first quadrant of the predetermined 64-QAM around the x-axis or by performing symmetric transformation for the last 4 bits of the third quadrant of the predetermined 64-QAM around the y-axis.

Yet another exemplary embodiment provides a method for receiving data based on a predetermined $2^q$-QAM constellation, the method comprising: receiving a signal from a transmitting apparatus; and demodulating the signal into a symbol based on a predetermined $2^q$-quadrature amplitude modulation (QAM) constellation including $2^q$ symbol decision regions corresponding to a q-bit symbol, respectively, wherein the demodulating the signal into a symbol based on a predetermined $2^q$-QAM constellation comprises: determining a first combined decision region including a symbol decision region in which the signal is located among four first combined decision regions to determine a first two bits of the symbol; determining a nth combined decision region including a symbol decision region in which the signal is located among four nth combined decision regions to determine a nth two bits of the symbol; and determining a final symbol decision region which is commonly included in the determined first combined decision region and the determined nth combined decision region.

The symbol may be a symbol allocated to the final symbol decision region.

The first combined decision region and the $n^{th}$ combined decision region may include four different symbol decision regions, respectively.

The predetermined $2^q$-QAM constellation may be a predetermined 16-QAM constellation and the symbol may be 4 bits, and the demodulating the signal into a symbol based on a predetermined $2^q$-QAM constellation may include: determining a first combined decision region including a symbol decision region in which the signal is located among four first combined decision regions to determine a first two bits of the symbol; determining a second combined decision region including a symbol decision region in which the signal is located among four second combined decision regions to determine a last two bits of the symbol; and determining a final symbol decision region which is commonly included in the determined first combined decision region and the determined second combined decision region.

The last 2 bits of a 4 bits corresponding to a quadrant of the predetermined 16-QAM constellation may be same with a gray code of the basic 4-QAM constellation, the last 2 bits of the 4 bits corresponding to the remaining quadrants of the predetermined 16-QAM constellation may be determined by performing symmetric transformation for the last 2 bits of the quadrant of the predetermined 16-QAM around the x-axis or the y-axis, and the first 2 bits of the 4 bits corresponding to each quadrant of the predetermined 16-QAM constellation may be determined by the basic 4-QAM constellation.

The predetermined $2^q$-QAM constellation may be a predetermined 64-QAM constellation and the symbol may be 6 bits, and the demodulating the signal into a symbol based on a predetermined $2^q$-QAM constellation may include: determining a first combined decision region including a symbol decision region in which the signal is located among four first combined decision regions to determine a first two bits of the symbol; determining a second combined decision region including a symbol decision region in which the signal is located among four second combined decision regions to determine a second two bits of the symbol; determining a third combined decision region including a symbol decision region in which the signal is located among four third combined decision regions to determine a last two bits of the symbol; and determining a final symbol decision region which is commonly included in the determined first combined decision region, the determined second combined decision region, and the determined third combined decision region.

The last 4 bits of a 6 bits corresponding to a quadrant of the predetermined 64-QAM constellation may be same with a gray code of the predetermined 16-QAM constellation, the last 4 bits of the 6 bits corresponding to the remaining quadrants of the predetermined 64-QAM constellation may be determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation may be determined by the basic 4-QAM constellation.

DETAILED DESCRIPTION OF THE EMBODIMENTS

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a transmitter and a receiver may be called a terminal, a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like.

Further, the transmitter and the receiver may be called a base station (BS), an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Figure 1:
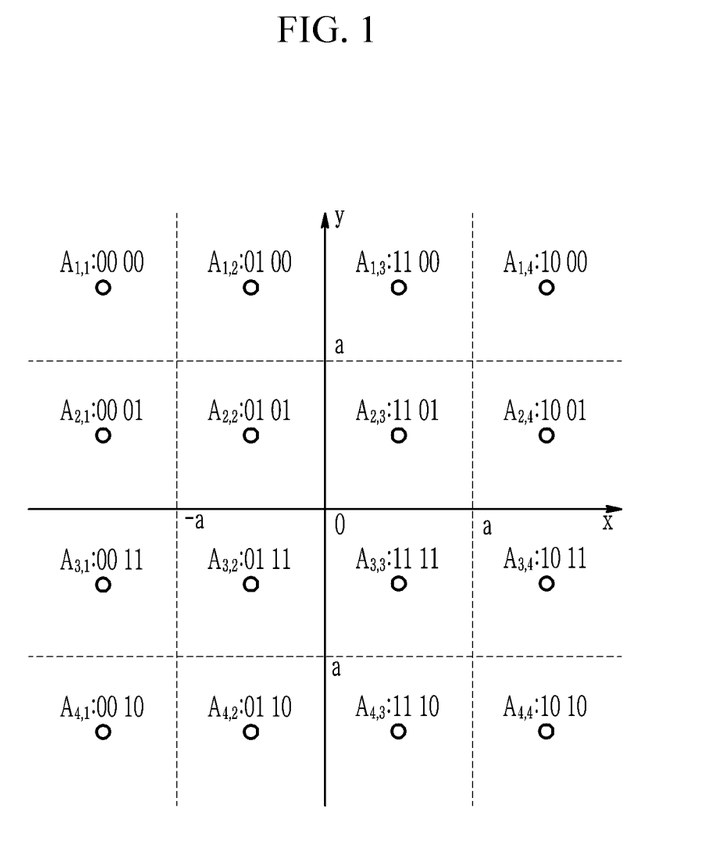
FIG. 1 is a diagram illustrating a two-dimensional orthogonal constellation of 16-QAM.
Figure 2:
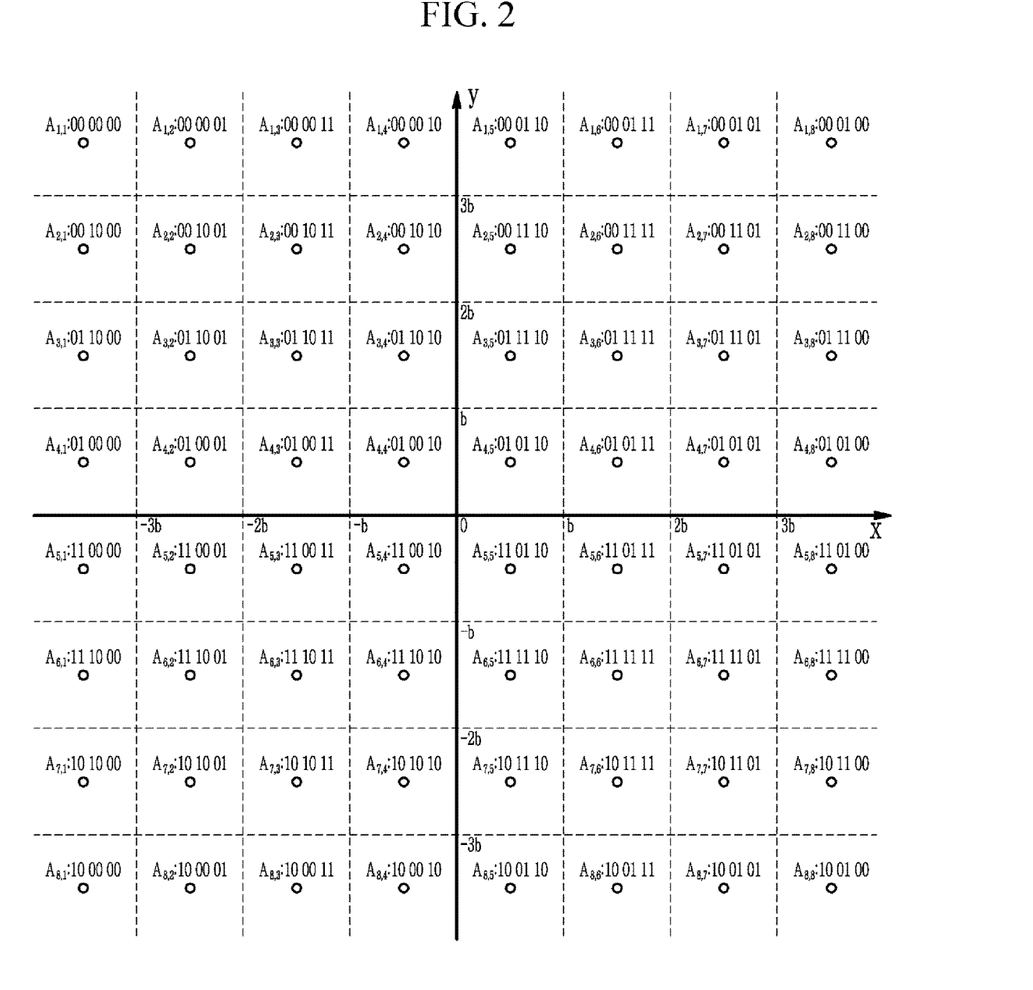
FIG. 2 is a diagram illustrating a two-dimensional orthogonal constellation of 64-QAM.

FIG. 1 is a diagram illustrating a two-dimensional orthogonal constellation of 16-QAM, and FIG. 2 is a diagram illustrating a two-dimensional orthogonal constellation of 64-QAM.

Referring to FIGS. 1 and 2, the constellation points are located in a two-dimensional plane with orthogonal axes. $A_{i,j}$ represents a symbol decision region (or a symbol decision partition) of the $i^{th}$ row and the $j^{th}$ column. In FIG. 1 and FIG. 2, the boundary of the symbol decision region is indicated by a dotted line. Gray code is introduced into the QAM constellation. Gray code can play an important role for error correction. In a QAM modulation scheme, data can typically be transmitted in a 4-bit symbol (16-QAM) or in a more bits of symbol (higher order QAM), and the constellation of the signal is arranged such that the bit pattern carried by the adjacent constellation point is only one bit different. By combining forward error correction scheme and Gray code that can correct a single bit error, any form of transmission error that could cause a constellation point to deviate to the symbol decision region of an adjacent constellation point can be corrected at the receiver, which making the transmission system less susceptible to noise.

Constellation rules, commonly known as Campopiano-Glazer configuration rules, may result in optimal signal set performance. According to this rule, a 2 k adjacent packed subset is selected as a signal constellation point from an infinite array of points as closely packed in a regular array or lattice. Therefore, in a two-dimensional signal space, the optimal boundary surrounding the array of points tends toward a circle. That is, optimal performance can be achieved by using a constellation having a circular boundary. However, compared with the rectangular constellation, the performance improvement resulted from the circular boundary is very small (i.e., only a modest 0.2 dB). Instead, the rectangular constellation has the advantage that it can be easily modulated to two pulse amplitude modulation (PAM) signals on a quadrature carrier and can be easily demodulated.

Referring to FIG. 1, the constellation includes a total of 16 regions ($A_{i,j}$), and each region can be used as a decision region for symbol errors in the demodulation process. In this case, the symbol error rate (SER) performance after demodulation for all the constellation points is determined according to the channel characteristics and the area size of the decision region. Obviously, when the channel environment is fixed, the SER performance can be determined according to the area size of the decision region with a given symbol power. The larger the size of the decision region may provide the better SER performance.

The Gray mapping method for 16-QAM constellation according to an exemplary embodiment is as follows.

Figure 3:
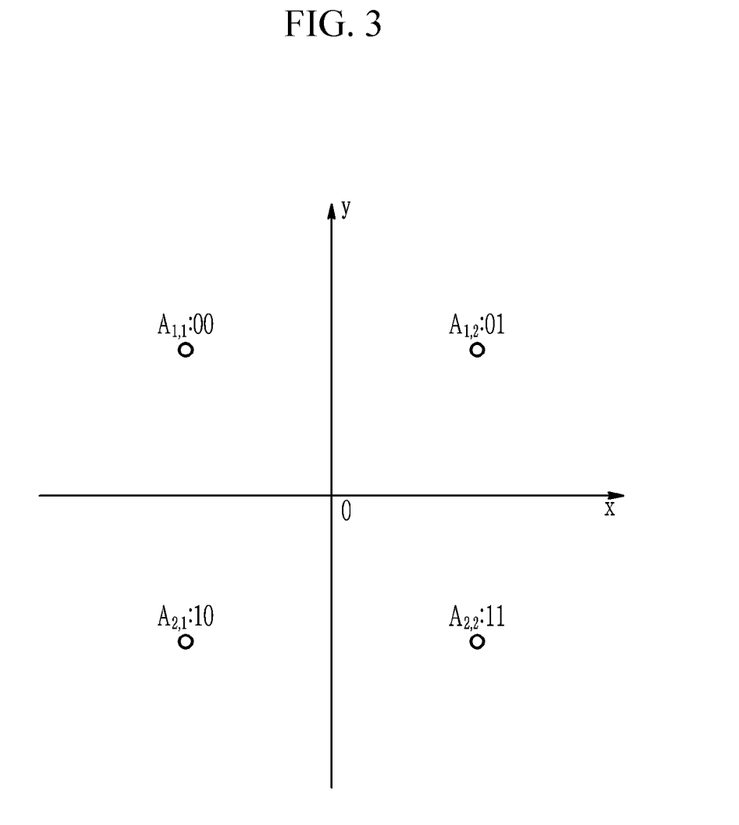
FIG. 3 is a diagram illustrating a basic 4-QAM constellation.

1. Gray code mapping method according to the exemplary embodiment starts from a basic 4-QAM constellation diagram illustrated in FIG. 3. The basic 4-QAM constellation diagram follows the conventional Gray code mapping scheme. However, any basic 4-QAM constellation Gray code mapping may be used, and FIG. 3 is merely an example of it.

2. Then, for the novel 16-QAM Gray mapping according to the exemplary embodiment, the last 2 bits corresponding to the second quadrant of the novel 16-QAM constellation are determined by the basic 4-QAM Gray code of FIG. 3. That is, the last 2 bits of the symbol decision regions $A_{1,1}$, $A_{1,2}$, $A_{2,1}$, and $A_{2,2}$ are same with the basic 4-QAM Gray mapping.

3. The last two bits corresponding to the first quadrant of the novel 16-QAM are determined by performing symmetric transformation for the last 2 bits in the second quadrant around the y-axis. Also, the last two bits corresponding to the third quadrant of the novel 16-QAM are determined by performing symmetric transformation for the last 2 bits in the second quadrant around the x-axis. Also, the last two bits corresponding to the fourth quadrant of the novel 16-QAM are determined by performing symmetric transformation for the last 2 bits in the third quadrant around the y-axis or rotating the last 2 bits on the first quadrant around the x-axis.

4. The Gray code for the first two bits of each quadrant may follow the basic 4-QAM Gray code mapping. For example, 01 is allocated to the first two bits of the first quadrant, 00 is allocated to the first two bits of the second quadrant, 10 is allocated to the first two bits of the third quadrant, and 11 is allocated to the first two bits of the fourth quadrant.

At this time, the order of the Gray code mapping in each quadrant of the basic 4-QAM constellation is not important. However, the novel Gray mapping method for the first two bits may be the same as the Gray code mapping scheme of the basic 4-QAM constellation.

Figure 4:
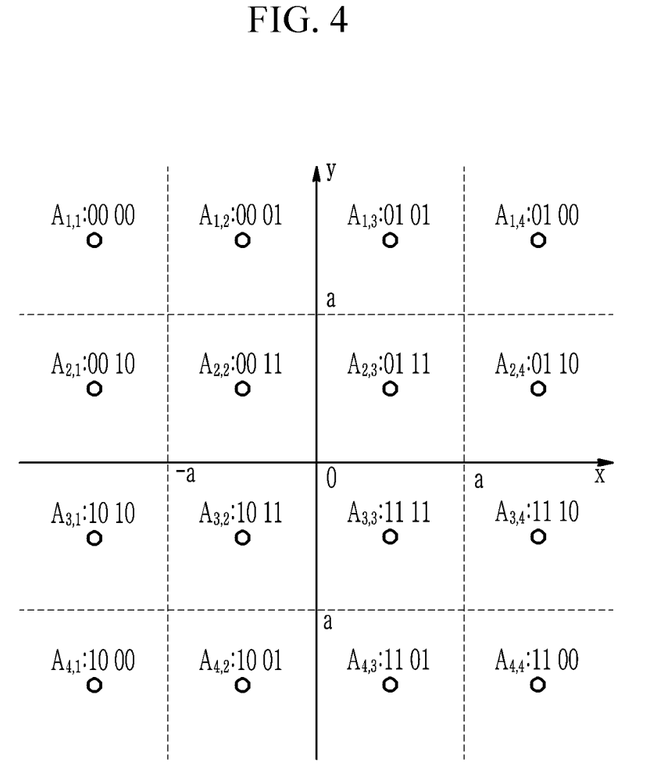
FIG. 4 is a diagram illustrating a two-dimensional orthogonal constellation of 16-QAM according to an exemplary embodiment.
Figure 5:
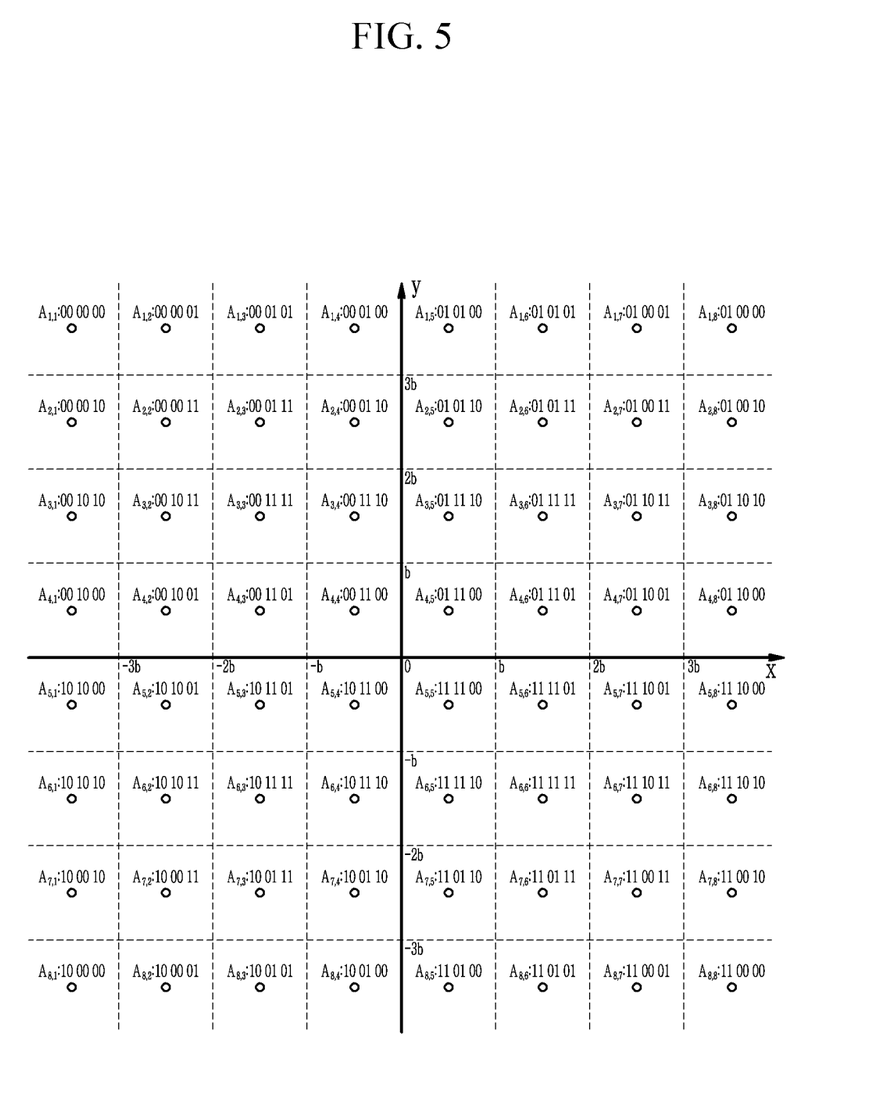
FIG. 5 is a diagram illustrating a two-dimensional orthogonal constellation of 64-QAM obtained from 16-QAM according to the exemplary embodiment.

FIG. 4 is a diagram illustrating a two-dimensional orthogonal constellation of 16-QAM according to an exemplary embodiment, and FIG. 5 is a diagram illustrating a two-dimensional orthogonal constellation of 64-QAM obtained from 16-QAM according to the exemplary embodiment.

According to the exemplary embodiment, a transmitter modulates the data based on the novel $2^q$-QAM constellation and transmits the modulated data to a receiver.

The Gray code mapping of 64-QAM according to an exemplary embodiment begins by determining the last 4 bits corresponding to the second quadrant of the novel 64-QAM constellation based on the 16-QAM constellation shown in FIG. 4. That is, the last 4 bits corresponding to the second quadrant of the novel 64-QAM constellation are same with the Gray code in the 16-QAM constellation shown in FIG. 4. Then, the last 4 bits corresponding to the first quadrant of the novel 64-QAM are determined by performing symmetric transformation for the last 4 bits of the second quadrant around the y-axis, and the last 4 bits corresponding to third quadrant of the novel 64-QAM constellation are determined by performing symmetric transformation for the last 4 bits of the second quadrant around the x-axis. The last 4 bits corresponding to the fourth quadrant of the novel 64-QAM are determined by performing symmetric transformation for the last 4 bits of the third quadrant around the y-axis or by performing symmetric transformation for the last 4 bits of the first quadrant around the x-axis.

According to the exemplary embodiment, a Gray mapping (or constellation mapping) of $2^q$-QAM (q=4, 6, 8, . . . , i.e. q is a multiple of 2 greater than 2) begins by applying the Gray code of the $2^{q-2}$-QAM constellation to the last q-2 bit corresponding to a quadrant of the quadrants included in the $2^q$-QAM constellation. And the last q-2 bits corresponding to the remaining quadrants included in the $2^q$-QAM constellation may be determined by performing symmetric transformation for the last q-2 bits to which the Gray code of the $2^{q-2}$-QAM constellation is applied around the x-axis or y-axis.

For example, a $2^{q-2}$-QAM Gray code may be applied to the last q-2 bits corresponding to the second quadrant of the $2^q$-QAM constellation. The last q-2 bits corresponding to the remaining quadrants included in the $2^q$-QAM constellation may then be determined by performing symmetric transformation for the last q-2 bits of the second quadrant around the x-axis or the y-axis. That is, the last q-2 bits corresponding to the first quadrant of the $2^q$-QAM constellation are determined by performing symmetric transformation for the last q-2 bit of the second quadrant around the y-axis, the last q-2 bits corresponding to the third quadrant of the $2^q$-QAM constellation are determined by performing symmetric transformation for the last q-2 bits of the second quadrant around the x-axis, and the last q-2 bits corresponding to the fourth quadrant of the $2^q$-QAM constellation are determined by performing symmetric transformation for the last q-2 bits of the third quadrant around the y-axis or by performing symmetric transformation for the last q-2 bits of the first quadrant around the x-axis. And the mapping of the first 2 bits of $2^q$-QAM constellation (i.e., the first 2 bits of the q bits except the last q-2 bits) may follow the pattern of the basic 4-QAM constellation.

According to an exemplary embodiment, the receiver performs a simultaneous parallel demodulation process on the signal received from the transmitter based on the novel $2^q$-QAM constellation. At this time, the parallel demodulation process may be suitable for a two-dimensional quadrature QAM modulation scheme with a modulation order of 16-QAM or higher order, and each demodulation process is performed for two adjacent bits. If the symbol is q bits, q/2 demodulation processes are simultaneously performed in parallel.

The demodulation according to the exemplary embodiment is performed in a unit of two adjacent bits of the received symbol. A demodulation process according to the exemplary embodiment demodulates two adjacent bits using a combined decision region. According to the exemplary embodiment, the $2^q$-QAM constellation includes $2^q$ symbol decision regions, and each symbol decision region corresponds to a q-bit symbol. Further, the number n of demodulation processes is determined by q/2 (n=q/2), and each demodulation processes use four combined decision regions. Therefore, the number of symbol decision regions included in the combined decision region of each demodulation process is $2^q/4$, and the combined decision region corresponding to the each demodulation process includes different symbol decision regions.

For example, since the symbol of the novel 16-QAM is 4 bits, a total of 2 demodulation processes are performed in parallel in the unit of 2-bits. The first 2-bits of the received symbol based on 16-QAM constellation are demodulated using a first combined decision region of a first demodulation process. That is, in the first demodulation process, to determine the first two bits of the symbol, it is determined which of four combined decision regions the received signal is located in, where each of the combined decision region includes four symbol decision regions. The first two bits corresponding to the each symbol decision region included in the first combined decision region for the first demodulation process are all the same. Each quadrant of the 16-QAM constellation according to an exemplary embodiment includes the same symbol decision region as the combined decision region of the first demodulation process. Referring to FIG. 4, in the four symbol decision regions included in the second quadrant, the corresponded first two bits are 00, the corresponded first two bits in the first quadrant are 01, and the corresponded first two bits in the third quadrant are 10, and the corresponded first two bits in fourth quadrant are 11. The following shows the four symbol decision regions included in first combined decision region.

A first combined decision region of the first demodulation process of 16-QAM for the first two bits according to an exemplary embodiment
1-1 combined decision region: $\{A_{1,1}, A_{1,2}, A_{2,1}, A_{2,2}\}$
1-2 combined decision region: $\{A_{1,3}, A_{1,4}, A_{2,3}, A_{2,4}\}$
1-3 combined decision region: $\{A_{3,1}, A_{3,2}, A_{4,1}, A_{4,2}\}$
1-4 combined decision region: $\{A_{3,3}, A_{3,4}, A_{4,3}, A_{4,4}\}$ In a second demodulation process that is simultaneously performed with the first demodulation process, the last 2-bits of the symbol received based on 16-QAM constellation are demodulated using the second combined decision region. That is, to determine the last two bits of the symbol, it is determined which of four second combined decision regions the received symbol is located in, where each of the combined decision region includes four symbol decision regions. The last two bits corresponding to the each symbol decision region included in the second combined decision region for the second demodulation process according to the novel 16-QAM constellation are all the same. The four symbol decision regions included in each second combined decision region are as follows.

A second combined decision region of the second demodulation process of 16-QAM for the second (last) two bits according to an exemplary embodiment
2-1 combined decision region: $\{A_{1,1}, A_{1,4}, A_{4,1}, A_{4,4}\}$
2-2 combined decision region: $\{A_{1,2}, A_{1,3}, A_{4,2}, A_{4,3}\}$
2-3 combined decision region: $\{A_{2,2}, A_{2,3}, A_{3,2}, A_{3,3}\}$
2-4 combined decision region: $\{A_{2,1}, A_{2,4}, A_{3,1}, A_{3,4}\}$ Then, it is determined that the received symbol corresponds to a symbol determination region commonly included in q/2 combined decision regions determined through q/2 demodulation processes. For example, in the demodulation according to the novel 16-QAM constellation, if it is determined that the received symbol is located in the 1-2 combined decision region during the first demodulation process and the received symbol is located in the 2-3 combined decision region during the second demodulation process, the final symbol decision region corresponding to the received signal is $A_{2,3}$ and the received symbol is 0111 because the $A_{2,3}$ is commonly included in the 1-2 combined decision region of the first combined decision region and the 2-3 combined decision region of the second combined decision region.

Obviously, the area of the combined decision region is larger than the decision region of the conventional QAM demodulation scheme, that is, the area of the single decision region. As shown above, the area of the combined decision region of the first demodulation process using the novel 16-QAM constellation is the same as the area of the entire area of the 4-QAM demodulation scheme, and the area of the combined decision region of the second demodulation process Is larger than the area of a single decision region of the conventional 16-QAM demodulation scheme.

For example, since the symbols in the novel 64-QAM constellation are 6 bits, three demodulation processes are performed in parallel in a 2-bits unit. The first combined decision region of the first demodulation process for determining the first two bits includes 16 symbol decision regions in which the first two bits are the same, the second combined decision region of the second demodulation process for determining the second two bits includes 16 symbol decision regions in which the second 2 bits are the same, and the third combined decision region in the third demodulation process for determining the last 2 bits includes 16 symbol decision regions in which the last two bits are the same. Referring to FIG. 5, the symbol decision region included in each combined decision region is as follows.

A first combined decision region of the first demodulation process of 64-QAM according to an exemplary embodiment
$\{A_{1,1}, A_{1,2}, A_{1,3}, A_{1,4}, A_{2,1}, A_{2,2}, A_{2,3}, A_{2,4}, A_{3,1}, A_{3,2}, A_{3,3}, A_{3,4}, A_{4,1}, A_{4,2}, A_{4,3}, A_{4,4}\}$
$\{A_{1,5}, A_{1,6}, A_{1,7}, A_{1,8}, A_{2,5}, A_{2,6}, A_{2,7}, A_{2,8}, A_{3,5}, A_{3,6}, A_{3,7}, A_{3,8}, A_{4,5}, A_{4,6}, A_{4,7}, A_{4,8}\}$
$\{A_{5,1}, A_{5,2}, A_{5,3}, A_{5,4}, A_{6,1}, A_{6,2}, A_{6,3}, A_{6,4}, A_{7,1}, A_{7,2}, A_{7,3}, A_{7,4}, A_{8,1}, A_{8,2}, A_{8,3}, A_{8,4}\}$,
$\{A_{5,5}, A_{5,6}, A_{5,7}, A_{5,8}, A_{6,5}, A_{6,6}, A_{6,7}, A_{6,8}, A_{7,5}, A_{7,6}, A_{7,7}, A_{7,8}, A_{8,5}, A_{8,6}, A_{8,7}, A_{8,8}\}$.

A second combined decision region of the second demodulation process of 64-QAM according to an exemplary embodiment
$\{A_{1,1}, A_{1,2}, A_{1,7}, A_{1,8}, A_{2,1}, A_{2,2}, A_{2,7}, A_{2,8}, A_{7,1}, A_{7,2}, A_{7,7}, A_{7,8}, A_{8,1}, A_{8,2}, A_{8,7}, A_{8,8}\}$
$\{A_{1,3}, A_{1,4}, A_{1,5}, A_{1,6}, A_{2,3}, A_{2,4}, A_{2,5}, A_{2,6}, A_{7,3}, A_{7,4}, A_{7,5}, A_{7,6}, A_{8,3}, A_{8,4}, A_{8,5}, A_{8,6}\}$
$\{A_{3,3}, A_{3,4}, A_{3,5}, A_{3,6}, A_{4,3}, A_{4,4}, A_{4,5}, A_{4,6}, A_{5,3}, A_{5,4}, A_{5,5}, A_{5,6}, A_{6,3}, A_{6,4}, A_{6,5}, A_{6,6}\}$
$\{A_{3,1}, A_{3,2}, A_{3,7}, A_{3,8}, A_{4,1}, A_{4,2}, A_{4,7}, A_{4,8}, A_{5,1}, A_{5,2}, A_{5,7}, A_{5,8}, A_{6,1}, A_{6,2}, A_{6,7}, A_{6,8}\}$ A third combined decision region of the third demodulation process of 64-QAM according to an exemplary embodiment
$\{A_{1,1}, A_{1,4}, A_{1,5}, A_{1,8}, A_{4,1}, A_{4,4}, A_{4,5}, A_{4,8}, A_{5,1}, A_{5,4}, A_{5,5}, A_{5,8}, A_{8,1}, A_{8,4}, A_{8,5}, A_{8,8}\}$
$\{A_{1,2}, A_{1,3}, A_{1,6}, A_{1,7}, A_{4,2}, A_{4,3}, A_{4,6}, A_{4,7}, A_{5,2}, A_{5,3}, A_{5,6}, A_{5,7}, A_{8,2}, A_{8,3}, A_{8,6}, A_{8,7}\}$
$\{A_{2,2}, A_{2,3}, A_{2,6}, A_{2,7}, A_{3,2}, A_{3,3}, A_{3,6}, A_{3,7}, A_{6,2}, A_{6,3}, A_{6,6}, A_{6,7}, A_{7,2}, A_{7,3}, A_{7,6}, A_{7,7}\}$
$\{A_{2,1}, A_{2,4}, A_{2,5}, A_{2,8}, A_{3,1}, A_{3,4}, A_{3,5}, A_{3,8}, A_{6,1}, A_{6,4}, A_{6,5}, A_{6,8}, A_{7,1}, A_{7,4}, A_{7,5}, A_{7,8}\}$.

It should be noted that parallel demodulation for every 2 bits is possible because each bit is independent from each other and the demodulation process for every 2 bits is an independent process.

As described above, the demodulation method according to an exemplary embodiment provides a larger area of the decision region than the area of the conventional demodulation scheme. However, in addition to the size and channel of the decision region, the constellation distribution in each decision region also affects the error probability performance. As described above, it is assumed that the source information bits are generated randomly with independent and equal probability, and that the channel is an additive white Gaussian noise (AWGN) channel with an average 0 and a variance $\sigma^2$. The error probability of the 16-QAM symbol in the decision region $A_{1,1}$ according to the conventional QAM scheme is represented by Equation 1 below.

$$P_{e,A_{1,1}} = \underbrace{\frac{1}{\sqrt{2\pi}\,\sigma} \int_{-2a}^{\infty} e^{-\frac{(x+3a)^2}{2\sigma^2}} dx}_{\text{real part}} + \underbrace{\frac{1}{\sqrt{2\pi}\,\sigma} \int_{-\infty}^{\infty} e^{-\frac{(x-3a)^2}{2\sigma^2}} dx}_{\text{imaginary part}}, \quad \text{(Equation 1)}$$

$$= 2Q(a/\sigma),$$

In Equation 1, $P_{e,A_{1,1}}$ is the symbol error probability of the symbol decision region located in the $i^{th}$ row and $j^{th}$ column. $Q(\cdot)$ is a Q-function known as shown in Equation 2 below, where only adjacent symbol errors (1 bit error) are considered.

$$Q(x) = \frac{1}{\sqrt{2\pi}} \int_x^{\infty} e^{(-u^2/2)} du \quad \text{(Equation 2)}$$

Also, the symbol error probability for the decision regions $A_{1,2}$, $A_{2,1}$, and $A_{2,2}$ can be obtained as Equation 3 below.

$$P_{e,A_{1,2}} = P_{e,A_{2,1}} = 3Q(a/\sigma)$$

$$P_{e,A_{2,2}} = 4Q(a/\sigma) \quad \text{(Equation 3)}$$

Considering the appearance probability of the source information, the total SER and the bit error rate (BER) in the conventional 16-QAM demodulation scheme are expressed by Equation (4) below.

$$P_{conSER} = \frac{4}{16} \cdot P_{e,A_{1,1}} + \frac{4}{16} \cdot P_{e,A_{1,2}} + \quad \text{(Equation 4)}$$
$$\frac{4}{16} \cdot P_{e,A_{2,1}} + \frac{4}{16} \cdot P_{e,A_{2,2}}$$
$$= 3Q(a/\sigma),$$

$$P_{conBER} = \frac{1}{4} \cdot P_{conSER}$$

In the Equation 4, since the symbol of the 16-QAM is 4 bits, the probability $P_{conBER}$ of the BER is ¼ of the probability $P_{conSER}$ of the SER.

According to the parallel demodulation method according to the exemplary embodiment, the symbol of 16-QAM may be composed of two virtual symbols $V_1$ and $V_2$ corresponding to two adjacent bits. At this time, $V_1$ corresponds to the first two bits, and $V_2$ corresponds to the last two bits. For each virtual symbol $V_1$ and $V_2$, SER and BER are calculated using the combined decision region of the novel 16-QAM constellation, as shown in Equation 5 below.

$$P_{proSER_{v1}} = \frac{4}{16} \cdot \quad \text{(Equation 5)}$$
$$[0 + Q(a/\sigma) + Q(a/\sigma) + 2Q(a/\sigma)],$$
$$= Q(a/\sigma),$$

$$P_{proBER_{v1}} = \frac{1}{2} \cdot Q(a/\sigma)$$

$$P_{proSER_{v2}} = \frac{4}{16} \cdot [2Q(a/\sigma) + 2Q(a/\sigma) + 2Q(a/\sigma) + 2Q(a/\sigma)],$$
$$= 2Q(a/\sigma),$$

$$P_{proBER_{v2}} = Q(a/\sigma)$$

Referring to the Equations 4 and 5, using the constellation mapping and demodulation method according to an exemplary embodiment, the overall SER and BER performance is the same as that of the conventional QAM constellation mapping and demodulation method. That is, Equation 6 is obtained. The reason is that a Gray code is assigned to the conventional QAM constellation and the QAM constellation according to the exemplary embodiment, and the uncoded SER and BER using an any type of constellation mapping theoretically may yield the same error probability performance.

$$P_{conSER} = P_{proSER_{v1}} + P_{proSER_{v2}} \quad \text{(Equation 6)}$$
$$P_{conBER} = (P_{proBER_{v1}} + P_{proBER_{v2}})/2$$

Table 1 shows SER and BER performance and overall performance of 2q-QAM modulation scheme of an exemplary embodiment.

TABLE 1

| | $V_1$: $b_1b_2$ | | $V_1$: $b_1b_2$ | | $V_1$: $b_1b_2$ | | $V_1$: $b_1b_2$ | | $V_1$: $b_1b_2$ | | ... | Overall (legacy demodulation scheme) | |
|---|---|---|---|---|---|---|---|---|---|---|---|---|---|
| | $SER_{V1}$ | $BER_{V1}$ | $SER_{V2}$ | $BER_{V2}$ | $SER_{V3}$ | $BER_{V3}$ | $SER_{V4}$ | $BER_{V4}$ | $SER_{V5}$ | $BER_{V5}$ | ... | SER | BER |
| 4-QAM | 2Q | Q | | | | | | | | | | 2Q | SER/2 |
| 16-QAM | Q | Q/2 | 2Q | Q | | | | | | | | 3Q | SER/4 |
| 64-QAM | Q/2 | Q/4 | Q | Q/2 | 2Q | Q | | | | | | 3.5Q | SER/6 |
| 256-QAM | Q/4 | Q/8 | Q/2 | Q/4 | Q | Q/2 | 2Q | Q | | | | 3.75Q | SER/8 |
| 1024-QAM | Q/8 | Q/16 | Q/4 | Q/8 | Q/2 | Q/4 | Q | Q/2 | 2Q | Q | | 3.875Q | SER/10 |
| $2^q$-QAM | $2^{(2-\frac{q}{2})}Q$ | $2^{(2-\frac{q}{2})}Q/2$ | ... | | ... | | ... | | 2Q | Q | | $[4-2^{(2-\frac{q}{2})}]Q$ | Q |

In the Table 1, $V_i$ represents an $i^{th}$ virtual symbol, and $b_i$ represents an $i^{th}$ bit. Each virtual symbol corresponds to two adjacent bits. For example, $V_1$ corresponds to $b_1b_2$ and is shown in the Table 1 as $V_1$: $b_1b_2$. Q is an abbreviation of Q-function $Q=Q(a/\sigma)$. In the Table 1, the SER value of the virtual symbol is a geometric progression with an azimuth of ½. The characteristics of the Table 1 can be expressed as $$[4-2^{(2-\frac{q}{2})}].$$

$$SER_{V_1} = (1/2)^{j-i} SER_{V_1}, \text{ where } i, j \neq 0 \quad \text{(Equation 7)}$$

$$BER_{V_1} = SER_{V_1}/2$$

$$SER = \sum_{i=1}^{q/2} SER_{V_1}$$

$$BER = SER/q = \frac{2}{q}\sum_{i=1}^{q/2} BER_{V_1}$$

Referring to Table 1 and Equation 7, it can be seen that there is a performance difference between different virtual symbols by using the constellation mapping and demodulation method according to an exemplary embodiment. This performance difference is referred to as bit position diversity because it relates to the bit position in the symbol.

As described above, the constellation mapping and demodulation method according to the exemplary embodiment may not directly reduce the total number of errors, but bit position diversity may be introduced into the system by the constellation mapping and demodulation method according to the exemplary embodiment. There are various ways to exploit the bit position diversity gain, for example, bit position diversity may be applied to non-orthogonal multiple access (NOMA).

Different virtual symbols may yield different performances and the preceding virtual symbol may provide a better performance than the following virtual symbols, so that different virtual symbols can be allocated to different users of the NOMA system. The number of bits in a symbol for different users can be flexibly adopted. For example, in 64-QAM, two bits (2, 2, 2) can be allocated to each user if one symbol is 6 bits and there are three users. Or if there are two users, the 6 bits may be allocated to (2, 4) or (4, 2). Here, (m, n) means that the first m bits in the symbol are allocated to the first user and the remaining n bits are allocated to the second user. In this way, bit position diversity can be converted to multi-user diversity and diversity gain can be easily obtained. In addition, the constellation mapping and demodulation method according to the exemplary embodiment may provide better performance than a conventional NOMA successive interference cancellation (SIC) receiver on which a conventional QAM demodulation method is used.

Figure 6:
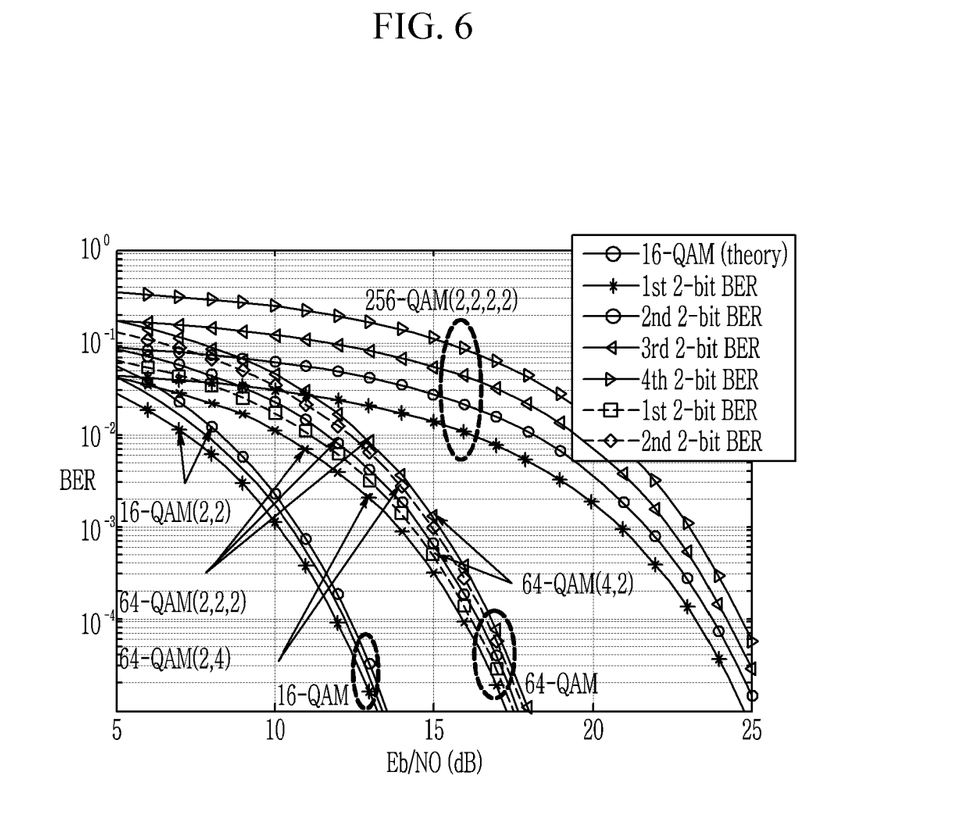
FIG. 6 is a graph comparing a BER of a conventional QAM constellation and a BER of a $2^q$-QAM constellation according to an exemplary embodiment.
Figure 7:
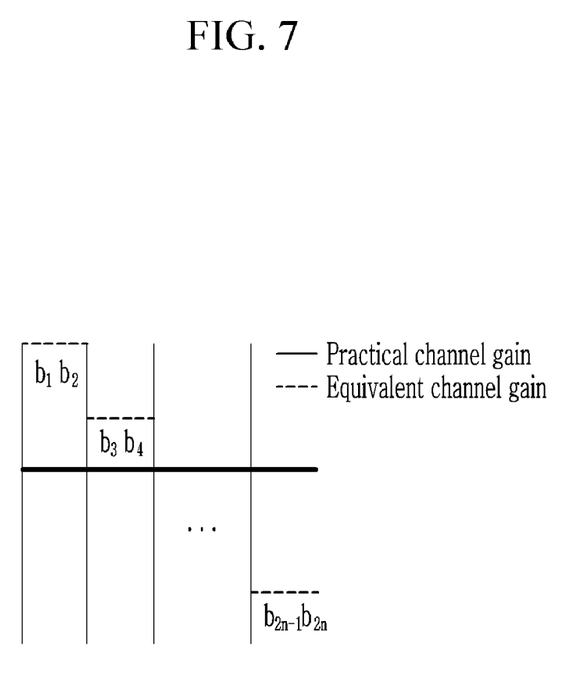
FIG. 7 is a conceptual diagram of bit position diversity according to an exemplary embodiment.

FIG. 6 is a graph comparing a BER of a conventional QAM constellation and a BER of a $2^q$-QAM constellation according to an exemplary embodiment, and FIG. 7 is a conceptual diagram of bit position diversity according to an exemplary embodiment.

Referring to FIG. 6, the BER curves of 16-QAM, 64-QAM, and 256-QAM applied the constellation mapping and demodulation method according to an exemplary embodiment and the theoretical BER curve of the existing 16-QAM demodulation scheme are compared. In 16-QAM demodulation, the BER performance of the first 2 bits (i.e., the first virtual symbol) is about 0.4 dB better than the BER performance of the theoretical curve when the target BER is $10^{-3}$, and the BER performance of the last 2 bits (i.e., the second virtual symbol) is about 0.6 dB better than that of the theoretical curve. That is, there is a difference of 0.6 dB between two virtual symbols (bit position diversity).

In addition, the theoretical curve showing the performance of the conventional demodulation lies between the BER curves of the two virtual symbols. This means that by using the constellation mapping method and the demodulation method according to the exemplary embodiment, the first virtual symbol can achieve better performance than the symbol demodulation through the conventional demodulation method. Based on Table 1, it is true for any $2^q$-QAM demodulation schemes that the first virtual symbol yields a better performance. The performance of the first virtual symbol or the plurality of virtual symbols in the $2^q$-QAM demodulation scheme is better than that of the conventional QAM demodulation. On the other hand, the amount of bit position diversity by different modulation schemes may become larger as the modulation order q increases.

In 64-QAM according to the exemplary embodiment, the bits may be allocated to three scenarios: (2,2,2), (2,4), (4,2). If the bits are allocated to (2,2,2), maximum diversity can be achieved, and the BER performance of the first two bits at the target BER $10^{-3}$ is about 0.8 dB better than the BER performance of the middle two bits, Which is better than 1.4 dB than last 2 bits. However, if the bits are allocated to (2,4), then the performance difference between the first 2 bits and the last 4 bits is 1.16 dB, and if the bits are allocated to (4,2), then the performance difference between the first 4 bits and the last 2 bits is 0.93 dB. That is, if more bits are allocated to a particular user, the overall performance for the entire user may converge to the performance of conventional demodulation. Also, if the same number of bits is not allocated to a plurality of users, it is more advantageous to achieve the bit position diversity by allocating less first bits in the QAM symbol because the BER curve of (2,4) shows better performance than the BER curve of (4,2).

In FIG. 7, the horizontal line represents the practical channel gain (solid line) after demodulation as observed by the receiver. Assuming that a channel on one QAM symbol is a flat fading channel, by using the $2^q$-QAM constellation mapping method and the demodulation method according to an exemplary embodiment, the equivalent channel gain (Dotted line) observed by the receiver is more fluctuating. And then the equivalent channel gain for the first two bits is greater than the equivalent channel gain for all the following two bits.

As described above, bit position diversity can be obtained using a $2^q$-QAM constellation mapping and demodulation method according to an exemplary embodiment. Also, similar to constellation multiplexing, a flexible transmitter/receiver structure may be applied to a MIMO system. For example, in a highly correlated channel environment, a plurality of transmitters may jointly form a constellation according to the exemplary embodiment, and may transmit data to at least one receiver in accordance with the formed constellation. In addition, the $2^q$-QAM constellation mapping method and the demodulation method according to an exemplary embodiment may be used in a NOMA system. In addition, the $2^q$-QAM constellation mapping method and the demodulation method according to an exemplary embodiment are also suitable for a wireless sensor network (WSN) in which a plurality of low cost sensors simultaneously transmit data to a collector. Also, the $2^q$-QAM constellation mapping method and the demodulation method according to an exemplary embodiment are suitable for an RFID system because a radio frequency identification (RFID) reader can simultaneously read data from a plurality of tags simultaneously by using the $2^q$-QAM constellation mapping method and the demodulation method according to the exemplary embodiment.

Figure 8:
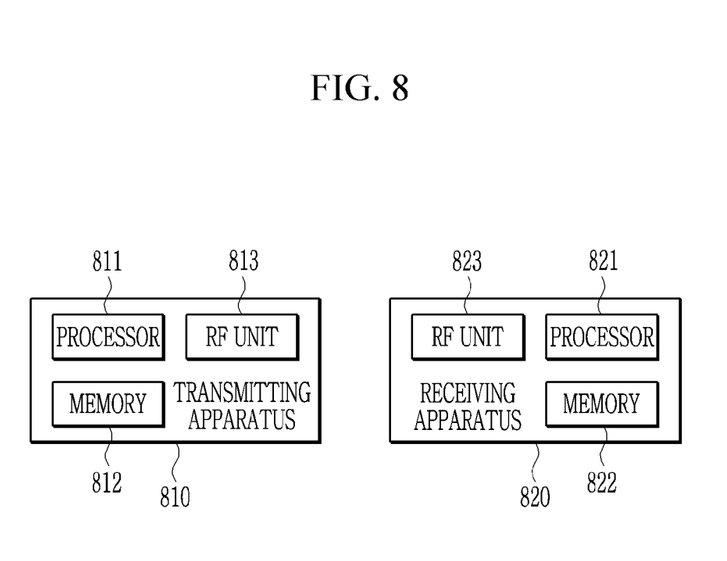
FIG. 8 is a block diagram illustrating a wireless communication system according to an exemplary embodiment.

FIG. 8 is a block diagram illustrating a wireless communication system according to an exemplary embodiment.

Referring to FIG. 8, a wireless communication system according to an exemplary embodiment includes a transmitting apparatus 810 and a receiving apparatus 820.

The transmitting apparatus 810 includes a processor 811, a memory 812, and a radio frequency unit (RF unit) 813. The memory 812 may be connected to the processor 811 to store various pieces of information for driving the processor 811 or at least one program executed by the processor 811. The radio frequency unit 813 may be connected to the processor 811 to transmit/receive a wireless signal. The processor 811 may implement functions, processes, or methods proposed by the exemplary embodiment of the present disclosure. In this case, in the wireless communication system according to the exemplary embodiment, a wireless interface protocol layer may be implemented by the processor 811. An operation of the transmitting apparatus 810 according to the exemplary embodiment may be implemented by the processor 811.

The receiving apparatus 820 includes a processor 821, a memory 822, and a radio frequency unit 823. The memory 822 may be connected to the processor 821 to store various pieces of information for driving the processor 821 or at least one program executed by the processor 821. The radio frequency unit 823 may be connected to the processor 821 to transmit/receive a wireless signal. The processor 821 may implement functions, processes, or methods proposed by the exemplary embodiment of the present disclosure. In this case, in the wireless communication system according to the exemplary embodiment, a wireless interface protocol layer may be implemented by the processor 821. An operation of the receiving apparatus 820 according to the exemplary embodiment may be implemented by the processor 821.

According to the exemplary embodiment, the memory may be positioned inside or outside the processor and the memory may be connected to the processor through already known various means. The memory is various types of volatile or non-volatile storage media. For example, the memory may include a read-only memory (ROM) or a random access memory (RAM).

While a present invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A transmitting apparatus for transmitting data in a wireless communication system, the apparatus comprising:
a processor, a memory, and a radio frequency unit,
wherein the processor executes a program stored in the memory to perform:
modulating data into a physical signal based on a predetermined $2^q$-quadrature amplitude modulation (QAM) constellation; and
transmitting the physical signal to a receiving apparatus,
wherein q is a multiple of 2 greater than 2, the data is q bits, a quadrant of the predetermined $2^q$-QAM constellation is determined based on a predetermined $2^{q-2}$-QAM constellation and a basic 4-QAM constellation, and remaining quadrants of the predetermined $2^q$-QAM constellation are determined based on the quadrant of the predetermined $2^q$-QAM constellation and the basic 4-QAM constellation, wherein
last q-2 bits of the q bits corresponding to the quadrant of the predetermined $2^q$-QAM constellation are same with a gray code of the predetermined $2^{q-2}$-QAM constellation, the q-2 bits of the q bits corresponding to the remaining quadrants of the predetermined $2^q$-QAM constellation are determined by performing symmetric transformation for the last q-2 bits of the quadrant of the predetermined $2^q$-QAM around the x-axis or the y-axis, and first 2 bits of the q bits corresponding to each quadrant of the predetermined $2^q$-QAM constellation are determined by a basic 4-QAM constellation.

2. The transmitting apparatus of claim 1, wherein:
the predetermined $2^q$-QAM constellation is a predetermined 16-QAM constellation, the data is 4 bits, the last 2 bits of a 4 bits corresponding to a quadrant of the predetermined 16-QAM constellation are same with a gray code of the basic 4-QAM constellation, the last 2 bits of the 4 bits corresponding to the remaining quadrants of the predetermined 16-QAM constellation are determined by performing symmetric transformation for the last 2 bits of the quadrant of the predetermined 16-QAM around the x-axis or the y-axis, and the first 2 bits of the 4 bits corresponding to each quadrant of the predetermined 16-QAM constellation are determined by the basic 4-QAM constellation.

3. The transmitting apparatus of claim 2, wherein:
the predetermined $2^q$-QAM constellation is a predetermined 64-QAM constellation, the data is 6 bits, the last 4 bits of a 6 bits corresponding to a quadrant of the predetermined 64-QAM constellation are same with a gray code of the predetermined 16-QAM constellation, the last 4 bits of the 6 bits corresponding to the remaining quadrants of the predetermined 64-QAM constellation are determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation are determined by the basic 4-QAM constellation.

4. A receiving apparatus for receiving signal in a wireless communication system, the apparatus comprising:
a processor, a memory, and a radio frequency unit,
wherein the processor executes a program stored in the memory to perform:
receiving a signal from a transmitting apparatus; and
demodulating the signal into a symbol based on a predetermined $2^q$-quadrature amplitude modulation (QAM) constellation including $2^q$ symbol decision regions corresponding to a q-bit symbol, respectively,
wherein when the processor performs the demodulating the signal into a symbol based on a predetermined $2^q$-QAM constellation, the processor performs:
determining a first combined decision region including a symbol decision region in which the signal is located among four first combined decision regions to determine a first two bits of the symbol;
determining a $n^{th}$ combined decision region including a symbol decision region in which the signal is located among four $n^{th}$ combined decision regions to determine a $n^{th}$ two bits of the symbol; and
determining a final symbol decision region which is commonly included in the determined first combined decision region and the determined $n^{th}$ combined decision region, and
wherein q is a multiple of 2 greater than 2, and n is an integer.

5. The receiving apparatus of claim 4, wherein the symbol is a symbol allocated to the final symbol decision region.

6. The receiving apparatus of claim 4, wherein the first combined decision region and the $n^{th}$ combined decision region includes four different symbol decision regions, respectively.

7. The receiving apparatus of claim 4, wherein the predetermined $2^q$-QAM constellation is a predetermined 16-QAM constellation and the symbol is 4 bits, and
when the processor performs the demodulating the signal into a symbol based on a predetermined $2^q$-QAM constellation, the processor performs:
determining a first combined decision region including a symbol decision region in which the signal is located among four first combined decision regions to determine a first two bits of the symbol;
determining a second combined decision region including a symbol decision region in which the signal is located among four second combined decision regions to determine a last two bits of the symbol; and
determining a final symbol decision region which is commonly included in the determined first combined decision region and the determined second combined decision region.

8. The receiving apparatus of claim 7, wherein last 2 bits of a 4 bits corresponding to a quadrant of the predetermined 16-QAM constellation are same with a gray code of a basic 4-QAM constellation, last 2 bits of 4 bits corresponding to the remaining quadrants of the predetermined 16-QAM constellation are determined by performing symmetric transformation for the last 2 bits of the quadrant of the predetermined 16-QAM around the x-axis or the y-axis, and first 2 bits of the 4 bits corresponding to each quadrant of the predetermined 16-QAM constellation are determined by the basic 4-QAM constellation.

9. The receiving apparatus of claim 8, wherein the quadrant is a second quadrant of the 16-QAM constellation, the last 2 bits of the 4 bits corresponding to a first quadrant of the remaining quadrant are determined by performing symmetric transformation for the last 2 bits of the second quadrant of the predetermined 16-QAM around the y-axis, the last 2 bits of the 4 bits corresponding to a third quadrant of the remaining quadrant are determined by performing symmetric transformation for the last 2 bits of the second quadrant of the predetermined 16-QAM around the x-axis, and the last 2 bits of the 6 bits corresponding to a fourth quadrant of the remaining quadrant are determined by performing symmetric transformation for the last 2 bits of the first quadrant of the predetermined 16-QAM around the x-axis or by performing symmetric transformation for the last 2 bits of the third quadrant of the predetermined 16-QAM around the y-axis.

10. The receiving apparatus of claim 8, wherein the predetermined $2^q$-QAM constellation is a predetermined 64-QAM constellation and the symbol is 6 bits, and
when the processor performs the demodulating the signal into a symbol based on a predetermined $2^q$-QAM constellation, the processor performs:
determining a first combined decision region including a symbol decision region in which the signal is located among four first combined decision regions to determine a first two bits of the symbol;
determining a second combined decision region including a symbol decision region in which the signal is located among four second combined decision regions to determine a second two bits of the symbol;
determining a third combined decision region including a symbol decision region in which the signal is located among four third combined decision regions to determine a last two bits of the symbol; and
determining a final symbol decision region which is commonly included in the determined first combined decision region, the determined second combined decision region, and the determined third combined decision region.

11. The receiving apparatus of claim 10, wherein the last 4 bits of a 6 bits corresponding to a quadrant of the predetermined 64-QAM constellation are same with a gray code of the predetermined 16-QAM constellation, the last 4 bits of the 6 bits corresponding to the remaining quadrants of the predetermined 64-QAM constellation are determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation are determined by the basic 4-QAM constellation.

12. The receiving apparatus of claim 11, wherein the quadrant is a second quadrant of the 64-QAM constellation, the last 4 bits of the 6 bits corresponding to a first quadrant of the remaining quadrant are determined by performing symmetric transformation for the last 4 bits of the second quadrant of the predetermined 64-QAM around the y-axis, the last 4 bits of the 6 bits corresponding to a third quadrant of the remaining quadrant are determined by performing symmetric transformation for the last 4 bits of the second quadrant of the predetermined 64-QAM around the x-axis, and the last 4 bits of the 6 bits corresponding to a fourth quadrant of the remaining quadrant are determined by performing symmetric transformation for the last 4 bits of the first quadrant of the predetermined 64-QAM around the x-axis or by performing symmetric transformation for the last 4 bits of the third quadrant of the predetermined 64-QAM around the y-axis.

13. A method for receiving signal in a wireless communication system, the method comprising:
receiving a signal from a transmitting apparatus; and
demodulating the signal into a symbol based on a predetermined $2^q$-quadrature amplitude modulation (QAM) constellation including $2^q$ symbol decision regions corresponding to a q-bit symbol, respectively,
wherein the demodulating the signal into a symbol based on a predetermined $2^q$-QAM constellation comprises:
determining a first combined decision region including a symbol decision region in which the signal is located among four first combined decision regions to determine a first two bits of the symbol;
determining a $n^{th}$ combined decision region including a symbol decision region in which the signal is located among four $n^{th}$ combined decision regions to determine a $n^{th}$ two bits of the symbol; and
determining a final symbol decision region which is commonly included in the determined first combined decision region and the determined $n^{th}$ combined decision region, and
wherein q is a multiple of 2 greater than 2, and n is an integer.

14. The method of claim 13, wherein the symbol is a symbol allocated to the final symbol decision region.

15. The method of claim 13, wherein the first combined decision region and the $n^{th}$ combined decision region includes four different symbol decision regions, respectively.

16. The method of claim 13, wherein the predetermined $2^q$-QAM constellation is a predetermined 16-QAM constellation and the symbol is 4 bits, and the demodulating the signal into a symbol based on a predetermined $2^q$-QAM constellation comprises:

determining a first combined decision region including a symbol decision region in which the signal is located among four first combined decision regions to determine a first two bits of the symbol;

determining a second combined decision region including a symbol decision region in which the signal is located among four second combined decision regions to determine a last two bits of the symbol; and determining a final symbol decision region which is commonly included in the determined first combined decision region and the determined second combined decision region.

17. The method of claim 16, wherein the last 2 bits of a 4 bits corresponding to a quadrant of the predetermined 16-QAM constellation are same with a gray code of the basic 4-QAM constellation, the last 2 bits of the 4 bits corresponding to the remaining quadrants of the predetermined 16-QAM constellation are determined by performing symmetric transformation for the last 2 bits of the quadrant of the predetermined 16-QAM around the x-axis or the y-axis, and the first 2 bits of the 4 bits corresponding to each quadrant of the predetermined 16-QAM constellation are determined by the basic 4-QAM constellation.

18. The method of claim 16, wherein the predetermined $2^q$-QAM constellation is a predetermined 64-QAM constellation and the symbol is 6 bits, and the demodulating the signal into a symbol based on a predetermined $2^q$-QAM constellation comprises:

determining a first combined decision region including a symbol decision region in which the signal is located among four first combined decision regions to determine a first two bits of the symbol;

determining a second combined decision region including a symbol decision region in which the signal is located among four second combined decision regions to determine a second two bits of the symbol;

determining a third combined decision region including a symbol decision region in which the signal is located among four third combined decision regions to determine a last two bits of the symbol; and determining a final symbol decision region which is commonly included in the determined first combined decision region, the determined second combined decision region, and the determined third combined decision region.

19. The method of claim 18, wherein the last 4 bits of a 6 bits corresponding to a quadrant of the predetermined 64-QAM constellation are same with a gray code of the predetermined 16-QAM constellation, the last 4 bits of the 6 bits corresponding to the remaining quadrants of the predetermined 64-QAM constellation are determined by performing symmetric transformation for the last 4 bits of the quadrant of the predetermined 64-QAM constellation around the x-axis or the y-axis, and the first 2 bits of the 6 bits corresponding to each quadrant of the predetermined 64-QAM constellation are determined by the basic 4-QAM constellation.

* * * * *